US010524226B2

(12) United States Patent
Chen

(10) Patent No.: US 10,524,226 B2
(45) Date of Patent: Dec. 31, 2019

(54) DETERMINING THE LOCATION OF A UAV IN FLIGHT UTILIZING REAL TIME KINEMATIC SATELLITE NAVIGATION AND PRECISE POINT POSITIONING

(71) Applicant: Skycatch, Inc., San Francisco, CA (US)

(72) Inventor: David Chen, San Francisco, CA (US)

(73) Assignee: Skycatch, Inc., San Francisco, CA (US)

( * ) Notice: Subject to any disclaimer, the term of this patent is extended or adjusted under 35 U.S.C. 154(b) by 236 days.

(21) Appl. No.: 15/727,165

(22) Filed: Oct. 6, 2017

(65) Prior Publication Data

US 2019/0110270 A1  Apr. 11, 2019

(51) Int. Cl.
*H04W 64/00* (2009.01)
*G06T 7/73* (2017.01)
*G08G 5/00* (2006.01)

(52) U.S. Cl.
CPC ............ *H04W 64/003* (2013.01); *G06T 7/75* (2017.01); *G08G 5/0013* (2013.01); *G08G 5/0069* (2013.01); *H04W 64/00* (2013.01)

(58) Field of Classification Search
CPC ...... H04W 64/003; H04W 64/00; G06T 7/75; G08G 5/0013; G08G 5/0069
See application file for complete search history.

(56) References Cited

U.S. PATENT DOCUMENTS

| 2016/0036519 A1* | 2/2016 | Loomis | H04B 7/22 370/316 |
| 2017/0269227 A1* | 9/2017 | Dai | G01S 19/29 |
| 2018/0095177 A1* | 4/2018 | Peake | G01S 19/07 |

* cited by examiner

*Primary Examiner* — Mary Cheung
(74) *Attorney, Agent, or Firm* — Keller Jolley Preece

(57) ABSTRACT

Systems and methods are disclosed for determining the position of a UAV in flight. In particular, in one or more embodiments, the disclosed systems utilize real time kinematic and precise point positioning techniques to identify the position of a UAV without use of RTK correction data from an RTK network. Moreover, the disclosed systems and methods can precisely and accurately determine the absolute position of a base station and a UAV in flight at various times during a flight mission without use of RTK correction data from an RTK network. In one or more embodiments, the disclosed systems and methods can utilize the absolute position of a UAV in flight to perform various aerial missions or tasks.

20 Claims, 6 Drawing Sheets

DETERMINING THE LOCATION OF A UAV IN FLIGHT UTILIZING REAL TIME KINEMATIC SATELLITE NAVIGATION AND PRECISE POINT POSITIONING

BACKGROUND

Unmanned Aerial Vehicles (UAVs) have become an increasingly common tool for performing a variety of flight missions and tasks. Indeed, in recent years, the reduced cost of using UAVs, especially compared to the cost of chartering manned aerial vehicles, has given many businesses and individuals the opportunity to engage in a variety of previously cost-prohibitive activities. For example, it is now common for individuals and businesses to utilize UAVs to perform flight missions for capturing digital aerial images in a variety of contexts, such as construction, mining, surveying, or land conservation.

Many UAV missions or tasks require very accurate knowledge of the position of the UAV. For example, some conventional systems generate three-dimensional models of a site utilizing digital aerial images of the site captured by a camera affixed to a UAV in flight. The positions of the camera affixed to the UAV at the various times that the camera captures the digital aerial images can be significant to the accuracy of the resulting three-dimensional model.

Some conventional survey location systems identify UAV positions by utilizing survey ground control points. In particular, these conventional survey location systems set up accurate ground control points on the Earth that a UAV captures in digital aerial images. UAVs can then utilize the digital aerial images portraying the ground control points to determine the position of the UAV (as well as a camera affixed to the UAV). Although these conventional survey location systems can identify UAV position with some accuracy, these conventional systems also have a variety of problems. For instance, it is often expensive and highly time-consuming to place and identify ground control points on a given site. In addition, survey ground control points require maintenance for continued visibility and uniformity over time. Moreover, the placement of survey ground control points introduces the possibility of human error.

Other conventional GPS location systems seek to avoid these problems by determining the precise position of a UAV using GPS technology that analyzes the contents of a carrier signal from a satellite to identify the location of an antennae affixed to the UAV. However, traditional GPS systems also have a number of problems. For example, atmospheric interference can cause inaccuracies in communications between satellites and signal receivers below the atmosphere, which often leads to imprecise GPS measurements (e.g., an error tolerance of decimeters).

Some conventional systems attempt to correct these inaccuracies by utilizing real time kinematic (RTK) networks. Specifically, conventional RTK location systems can utilize RTK networks that include reference stations with known positions in the vicinity of the UAV to correct for atmospheric (or other) inaccuracies. Although these conventional location systems can utilize RTK networks to identify the position of a UAV, they also have their own problems. For example, RTK reference stations are typically expensive (e.g., $10,000-$20,000 to purchase hardware), hard to use (e.g., difficult to operate correctly without special training), and introduce a large amount of human error (e.g., if measurements of base antenna is off in setting up an RTK station, output data will be compromised). Some conventional location systems avoid these costs by purchasing data from an established RTK network. However, purchasing RTK data to determine the position for a UAV is also typically quite expensive (e.g., $2,000-$3,000 annually) and only partially effective (e.g., coverage differs based on network provider and does not cover the entire globe).

Accordingly, a number of problems and disadvantages exist with conventional systems for precisely, accurately, and inexpensively determining the position of a UAV.

BRIEF SUMMARY

Embodiments of the present disclosure provide benefits and/or solve one or more of the foregoing or other problems in the art with systems and methods for accurately determining the position of a UAV in flight. In particular, in one or more of the embodiments, the disclosed systems and methods determine the precise position of a small, mobile base station and a UAV in flight by utilizing precise point positioning and real-time kinematic satellite navigation. For instance, the disclosed systems and methods can utilize a base station equipped with an (inexpensive) dual-frequency receiver to detect satellite signals and monitor satellite phase signals. The disclosed systems and methods can also utilize a UAV to similarly collect satellite phase signals. In one or more embodiments, the disclosed systems and methods then utilize the satellite signals received at the base station together with precise point positioning correction data to determine the precise location of the base station. Furthermore, the disclosed systems and methods can utilize the satellite phase signals collected at the UAV, the satellite phase signals monitored at base station, and the location of the base station to determine the precise location of the UAV.

For example, in one or more embodiments, the disclosed systems and methods detect, via a base station, signals transmitted from one or more satellites to the base station together with a first phase measurement of a first signal transmitted from the one or more satellites. Moreover, the disclosed systems and methods also detect, by a UAV in flight at a first position, a second phase measurement of a second signal transmitted from the one or more satellites to the UAV. The disclosed systems and methods can then identify the first position of the UAV in flight based on the one or more signals identified by the base station, PPP correction data, the phase measurement of the first signal transmitted from the one or more satellites to the base station, and the second phase measurement of the second signal transmitted from the one or more satellites to the UAV. More specifically, the disclosed systems and methods can identify the first position by determining a position of the base station utilizing the signal identified by the base station and the PPP correction data, determining a location of the UAV relative to the base station utilizing the second signal emitted from the one or more satellites to the UAV and RTK correction data (i.e., RTK correction data generated based on the phase of the first signal transmitted from the one or more satellites to the base station); and then utilizing the position of the base station and the location of the UAV relative to the base station to identify the first position of the UAV in flight.

The disclosed systems and methods provide a number of advantages over conventional positioning systems. For example, the disclosed systems and methods can determine accurate UAV locations (e.g., within a tolerance of 2 cm) without the cost or burden associated with survey ground control points. Similarly, the disclosed systems and methods can correct for atmospheric interference to determine the position of a UAV in flight with significantly less cost than traditional RTK positioning systems. Indeed, the disclosed systems and methods can correct for atmospheric interference without use of RTK correction data from an RTK network. More specifically, disclosed systems and methods can utilize an inexpensive base station equipped with a dual-frequency receiver and a dual-frequency antenna to determine positioning that is significantly less expensive than conventional RTK base stations and/or a subscription to global RTK network data services. Furthermore, the disclosed systems and methods can automatically determine location of a base station and UAV, thus avoiding the need for user training while reducing the chance for user error.

BRIEF DESCRIPTION OF THE DRAWINGS

The detailed description describes one or more embodiments with additional specificity and detail through the use of the accompanying drawings, as briefly described below.

DETAILED DESCRIPTION

Figure 1:
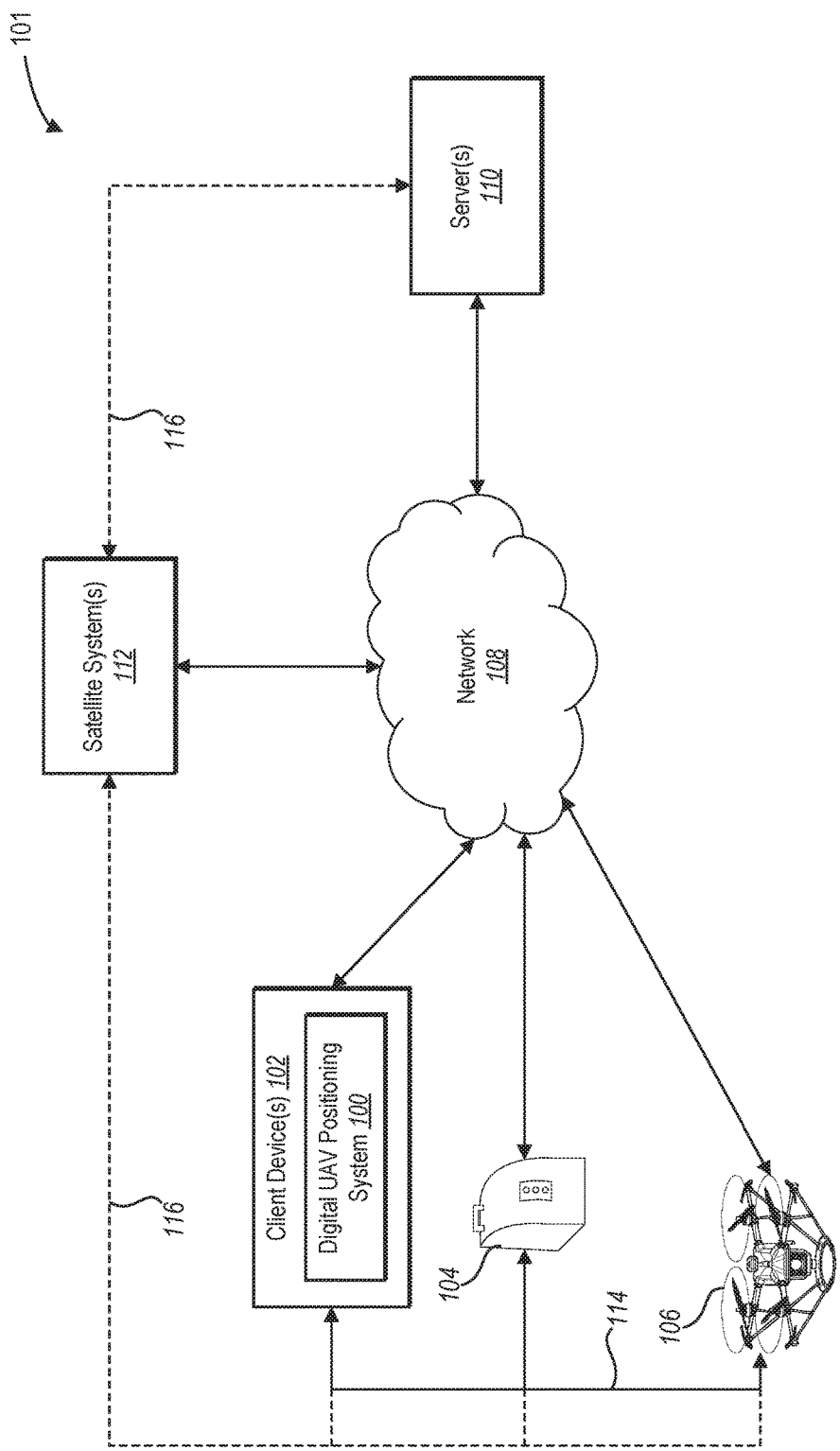
FIG. 1 illustrates a schematic diagram of a network environment in which the methods and systems disclosed herein may be implemented in accordance with one or more embodiments.

The present disclosure includes various embodiments and features of a digital unmanned aerial vehicle (UAV) positioning system and corresponding processes that assist in determining a position of a UAV during a flight mission. In particular, in one or more embodiments the digital UAV positioning system determines the position of a UAV in flight utilizing satellite signals received both by the UAV and a base station. Specifically, the digital UAV positioning system can detect satellite signals and monitor satellite phase signals at a base station. Moreover, the digital UAV positioning system can identify satellite phase signals via the UAV in flight. Based on the detected satellite signals at the base station together with PPP correction data, the digital UAV positioning system can determine an absolute location of the base station. Moreover, based on the absolute location of the base station, the satellite phase signals monitored at the base station, and the satellite phase signals identified via the UAV in flight, the digital UAV positioning system can determine the precise location of the UAV. In this manner, the digital UAV positioning system can quickly and inexpensively determine precise locations of a UAV in flight without the need to access RTK correction data from an established RTK network.

For example, in one or more embodiments, the digital UAV positioning system receives a carrier signal from one or more satellites utilizing a dual-frequency receiver at a base station. Moreover, the digital UAV positioning system also detects a phase measurement of a satellite signal from the one or more satellites via the base station. Furthermore, the digital UAV positioning system receives, via a UAV, a second phase measurement for a second satellite signal from the one or more satellites. The digital UAV positioning system then identifies PPP correction data (e.g., ephemeris data from a satellite system). The digital UAV positioning system then utilizes the satellite signal identified by the base station (e.g., to generate RTK correction data), the PPP correction data, the phase measurement of the first signal, and the second phase measurement of the second signal to determine the absolute position of the base station and the position of the UAV relative to the base station. Moreover, the digital UAV positioning system determines the absolute position of the UAV based on the absolute position of the base station and the position of the UAV relative to the base station.

Accordingly, in one or more embodiments, the digital UAV positioning system utilizes the base station as an inexpensive source for RTK correction data. Indeed, the digital UAV positioning system may utilize phase measurements from the base station to calculate RTK correction data in order to precisely locate the absolute position of a UAV without access to RTK correction data from an RTK network.

In one or more embodiments, the digital UAV positioning system utilizes a stationary base station to accurately determine a position of the UAV. Accordingly, in one or more embodiments, the digital UAV position system utilizes a base station equipped with an accelerometer to determine whether the base station is stationary or in motion. For instance, the digital UAV positioning system may use data from the accelerometer in the base station to ensure that the base station's position is constant (e.g., before initiating a flight mission and/or during a flight mission). Accordingly, in one or more embodiments, the digital UAV positioning system detects when the base station is stationary and consequently determines the absolute position of the base station. Similarly, the digital UAV positioning system may detect when the base station is in motion and stop or delay calculations, functions, or acts based on this movement. Further, the digital UAV positioning system may deliver a message to a client device indicating the base station's movement. The digital UAV positioning system may also automatically reset and recalculate the absolute position of the base station when the base station becomes stationary after a period of motion.

The digital UAV positioning system provides a number of advantages over conventional systems. Indeed, by using PPP correction data to determine the absolute position of the base station, and RTK correction data to determine the relative positions of the UAV and the base station, the UAV positioning system can determine the absolute position of the UAV quickly and accurately. Indeed, in one or more embodiments, the digital UAV positioning system can determine the position of a UAV in flight with an accuracy within 2 cm.

Furthermore, the digital UAV positioning system can accurately determine the location of a UAV at a significant reduction in cost. Indeed, utilizing a base station with a low-cost dual frequency antennae and receiver, the digital UAV positioning system can determine the location of the base station, generate RTK correction data, and accurately determine the precise location of a UAV in flight. The digital UAV positioning system can thus avoid the exorbitant cost of establishing a conventional RTK station or paying to access RTK correction data from an established global RTK network.

In addition, the digital UAV positioning system can automatically determine UAV position without the need for extensive training. Accordingly, the UAV positioning system can significantly reduce training costs and the risk of human error. Indeed, in one or more embodiments, a user can simply drop a base station, push a button, and begin a UAV flight mission, and the digital UAV positioning system can automatically monitor satellite signals and phase measurements, compute the precise location of the base station, and determine the location of the UAV throughout the flight mission.

Moreover, the UAV positioning system can accurately determine the position of a UAV after the UAV has completed a flight mission or while the UAV is in flight. Thus, the digital UAV positioning system can determine the absolute position of the UAV during flight and navigate the UAV based on the determined positions of the UAV. Similarly, the digital UAV positioning system can analyze position data of the UAV at times when the UAV captures digital aerial images and utilize the position data to generate three-dimensional models of the site. The digital UAV positioning system can then utilize the three-dimensional models to navigate the UAV and capture additional digital aerial images.

As used herein, the term "UAV" or "unmanned aerial vehicle" refers to an aircraft that can be piloted autonomously or remotely by a control system. A UAV may include any type of unmanned aircraft, including a micro UAV, low altitude UAV, or high altitude UAV, whether autonomously or remotely piloted. Moreover, a UAV may include a multi-rotor UAV, single-rotor UAV, blimp UAV, or other types of UAVs. In one or more embodiments, a UAV comprises a camera and/or GPS receiver affixed to the UAV. Additional detail regarding components and capabilities of UAVs in accordance with one or more embodiments are provided in relation to exemplary embodiments described herein.

As used herein, the term "signal" refers to an electromagnetic waveform. For instance, the term "signal" includes an electromagnetic waveform transmitted by a satellite. A signal can comprise a carrier signal. As used herein, the term "carrier signal" refers to a waveform that is modulated with an input signal. In particular, the term "carrier signal" includes a waveform transmitted by a satellite that is modulated with a signal to convey information. As described in further detail below, a signal (including a carrier signal) is transmitted having a wave length. In one or more embodiments, the digital UAV positioning system identifies a number of wave lengths in a signal between a UAV (e.g., a GPS receiver) and a satellite to determine a position of a UAV in flight.

As used herein, the term "phase measurement" refers to a measure of wavelengths in a signal. In particular, the term "phase measurement" includes data regarding the number of wavelengths between a transmitter and the receiver, the wavelength of the signal, and the phase of the signal at the time it was received. The phase of the signal at the time it is received may be a relative measurement compared with the phase of the receiving device's response signal.

As used herein, the term "flight mission" refers to a flight by a UAV to perform one or more tasks. For example, the term "flight mission" includes a UAV flight for capturing digital aerial images of a site.

As used herein, the term "RTK correction data" refers to data reflecting a signal received by a first device utilized to calculate a position of a second device. In particular, the term "RTK correction data" includes data reflecting a signal received by a reference station utilized to calculate a position of a UAV receiving the signal. For example, RTK correction data includes information regarding a signal received from a reference station to a UAV that enables the UAV to calculate a number of wavelengths in the signal between the UAV and the satellite. As described in greater detail below, in one or more embodiments, RTK correction data enables the UAV positioning system to account for atmospheric inaccuracies (e.g., signal delay or distortion caused by the ionosphere and/or troposphere) or inaccuracies due to a satellite clock and ephemerides. RTK correction data can come in a variety of forms. For example, the RTK correction data can comprise raw data indicating a signal received by a reference station. Similarly, the RTK correction data can comprise processed data that indicates a correction to apply to a signal received at a UAV.

As used herein, the term "PPP correction data" refers to data for correcting inaccuracies in position calculated from a carrier signal. In particular, the term "PPP correction data" includes data for correcting atmospheric inaccuracies in analyzing the contents of a dual-frequency carrier signal to determine position of an object utilizing precise point positioning. For example, "PPP correction data" may include ephemeris data, such as satellite clock data, satellite position data, and satellite health data. As described in greater detail below, in one or more embodiments, PPP correction data allows the digital UAV positioning system to account for atmospheric inaccuracies (e.g. signal delay or distortion caused by the ionosphere and/or troposphere) or inaccuracies due to a satellite clock and ephemerides.

As used herein, the term "position" refers to a location of an object relative to a reference. For example, a position of a UAV includes an x, y, and/or z coordinate that describes the location of the UAV (and/or its components) in a Cartesian coordinate system. The position of an object can be measured, expressed, or described in relation to any reference, including any coordinate system. For example, the position of a camera can be expressed in terms of a radial coordinate system, a Cartesian coordinate system, or some other system.

As used herein, the term "absolute position" refers to a location in reference to an established reference point on Earth (e.g., a position in reference to a survey landmark, monument, section corner, latitude, longitude, township, range, section, quarter section, quarter-quarter section, meridian, baseline, arpent, site reference, or local reference). For example, the static position of an object can be communicated via values for latitude, longitude, and altitude.

As used herein, the term "relative position" or "position relative to" refers to a location relative to another position or object (i.e., an object of known or unknown position). For example, when the relative position of an object is known, the difference between its position and another object's position is known. To illustrate, the relative position of an object can be communicated by a set of coordinates where the origin of the Cartesian system is the position of another object. A first object's position relative to the position of a second object may be known even if the absolute locations of both objects are unknown.

As used herein, the term "three-dimensional representation" refers to any digital data depicting a three-dimensional object or site. The term three-dimensional representation includes a three-dimensional point cloud, a three-dimensional mesh, a three-dimensional surface, or any other representation derived from the observation of a point or landmark from a single or multiple views.

As used herein, the term "site" refers to a location on Earth. In particular, the term site includes a location on Earth that a user seeks to capture in one or more digital aerial images (and/or one or more three-dimensional models). The term site can include a construction site, a mining site, a property, a wilderness area, a disaster area, or other location.

As used herein, the term "RTK network" refers to a plurality of RTK reference stations each having known absolute locations. For example, RTK correction data from an RTK network may be received from a continuously operating reference station network or a virtual reference station network via an internet connection.

Turning now to FIG. 1, further information will be provided regarding implementations of the digital UAV positioning system. Specifically, FIG. 1 illustrates a schematic diagram of one embodiment of an exemplary system environment 101 ("environment") in which an exemplary digital UAV positioning system 100 can operate. As illustrated in FIG. 1, the environment 101 can include client device(s) 102, a base station 104, a UAV 106, a network 108, server(s) 110, and satellite system(s) 112. The client device(s) 102, the base station 104, the UAV 106, the network 108, the server(s) 110, and the satellite system(s) 112 may be communicatively coupled with each other either directly or indirectly (e.g., through network 108 and/or by transmitting and receiving satellite signal(s) 116 via satellite). The client device(s) 102, the base station 104, the UAV 106, the network 108, the server(s) 110, and the satellite system(s) 112 may communicate using any communication platforms and technologies suitable for transporting data and/or communication signals, including any known communications, examples of which will be described in more detail below with respect to FIG. 6. The client device(s) 102 may send or receive many kinds of data (e.g. phase measurements, satellite data, satellite signal data, position data, RTK correction data, PPP correction data, flight mission data, etc.).

As mentioned, and as illustrated in FIG. 1, the environment 101 can include the client device(s) 102, which represent one example embodiment of a flight control device. The client device(s) may comprise any type of computing device. For example, the client device(s) 102 may comprise one or more personal computers, laptop computers, mobile devices, mobile phones, tablets, special purpose computers, TVs, or other computing devices. In one or more embodiments, the client device(s) 102 may comprise computing devices capable of communicating with the base station 104, the UAV 106, and/or the server(s) 110. More specifically, in one or more embodiments, a pilot may utilize the client device(s) 102 to locally control and/or communicate with the UAV. The client device(s) 102 may comprise one or more computing devices as discussed in greater detail below with regard to FIG. 6.

Moreover, FIG. 1 also illustrates that the environment 101 can include the base station 104, which can comprise a device operable to receive a signal from a satellite. The base station 104 may comprise a device operable to receive dual-frequency signals from satellites. In particular, in one or more embodiments, the base station 104 comprises a shell, an accelerometer, GPS dual-frequency receiver, and dual-frequency antenna. The base station 104 may also comprise a computing device and may communicate using any communication platforms and technologies suitable for transporting data and/or communication signals, including any known communications, examples of which will be described in more detail below with respect to FIG. 6. Moreover, in one or more embodiments, the base station 104 can also include a processor and a computer readable storage medium operable to analyze information regarding the received satellite signal in generating RTK correction data. In one or more embodiments, the base station 104 is enclosed in a lightweight shell with a handle for easy moving and re-positioning.

As mentioned above, in one or more embodiments, the base station 104 is equipped with an accelerometer that allows the digital UAV positioning system 100 to determine whether the base station is stationary or in motion. Thus, when the base station 104 is moved or re-positioned, the digital UAV positioning system 100 may automatically respond. For example, the digital UAV positioning system 100 may re-calculate the position of the base station 104 when the base station 104 becomes stationary after a period of motion. Similarly, the digital UAV positioning system 100 may stop or delay specific tasks based on detected motion at the base station 104. Additional detail regarding the base station 104 is provided below (e.g., in relation to FIG. 2).

As shown in FIG. 1, the environment 101 also includes the UAV 106, which includes a plurality of components and can comprise any type of unmanned aerial vehicle. In relation to FIG. 1, the UAV 106 is a multi-rotor vehicle, such as a quadcopter. The UAV 106 may include a carbon fiber shell, integrated electronics, a battery bay, various sensors and/or receivers, a camera capable of capturing digital aerial images, a flight controller clock, and/or a signal receiver. The UAV 106 may also include an onboard computer that controls the autonomous flight of the UAV 106 and performs various other functions. The UAV 106 also contains one or more computer-readable storage media and/or one or more processors with instructions stored thereon that, when executed by the one or more processors cause the UAV 106 to perform functions described herein.

As illustrated in FIG. 1, the client device(s) 102, the base station 104, the UAV 106, the server(s) 110, and the satellite system(s) 112 may communicate via the network 108. The network 108 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the network 108 may be any suitable network over which the client device(s) 102 (or other components) may access the server(s) 110 or vice versa. The network 108 will be discussed in more detail below with regard to FIG. 6.

Moreover, as illustrated in FIG. 1, the environment 101 may also include the server(s) 110. The server(s) 110 may generate, store, receive, and/or transmit any type of data (as discussed in greater detail below with regard to FIG. 4). For example, the server(s) can receive data from the client device(s) 102 and send the data to the UAV 106, and/or the base station 104. In one example embodiment, the server(s) 110 comprise a data server. The server(s) 110 can also comprise a communication server or a web-hosting server. Additional details regarding the server(s) 110 will be discussed below with regard to FIG. 6.

As shown in FIG. 1, the environment 101 also includes the satellites system(s) 112. The satellite system(s) 112 can comprise a plurality of satellites orbiting the Earth and transmitting signals. In particular, the satellite system(s) 112 comprises a plurality of orbital satellites transmitting various signals. The satellite system(s) 112 may also include one or more computing devices (e.g., servers) that store, send, and receive information regarding orbital satellites. For example, the satellite system(s) 112 can include satellites that broadcast navigation information, including pseudorandom noise codes and/or time. The satellite system(s) 112 can also include one or more third-party servers that maintain and provide satellite ephemerides, and PPP correction data including ephemeris data that may comprise satellite position data, satellite clock data, and satellite health data. For example, the third-party server may be provided by the International GSS Service (IGS). This data may be transmitted via the network 108 to the client device(s) 102, the base station 104, the UAV 106, or any other component of the digital UAV positioning system 100 capable of receiving data. Additional detail regarding the satellites system(s) is provided below (e.g., in relation to FIG. 2).

Although FIG. 1 illustrates client device(s) 102, the single base station 104, and the single UAV 106, it will be appreciated that the client device(s) 102, the base station 104, and the UAV 106 can represent any number of computing devices, base stations, and UAVs (fewer or greater than shown). Similarly, although FIG. 1 illustrated a particular arrangement of the client device(s) 102, the base station 104, the UAV 106, the network 108, the server(s) 110, and the satellite system(s) 112, various additional arrangements are possible.

For example, the client device(s) 102, the base station 104, and/or the UAV 106 may communicate directly with one another via a local connection 114. The local connection 114 may comprise any recognized form of wireless communication. For example, in one or more embodiments the client device(s) 102 may include a mobile computing device (e.g., tablet) utilized by a UAV operator to communicate with the UAV 106 and the reference station using BLUETOOTH technology.

As illustrated by FIG. 1, in one or more embodiments, the digital UAV positioning system 100 is implemented via the client device(s) 102. However, in some embodiments, the digital UAV positioning system 100 may be implemented, in whole or in part, by the individual elements 102-110 of the environment 101. For example, the UAV positioning system 100 may be implemented entirely on the server(s) 110. Similarly, the digital UAV positioning system 100 may be implemented on the client device(s) 102, the base station 104, the UAV 106, and/or the server(s) 110. Moreover, different components and functions of the digital UAV positioning system 100 may be implemented separately among the client device(s) 102, the base station 104, the UAV 106, and/or the server(s) 110.

By way of example, in one or more embodiments, the UAV 106 begins a mission plan at a site and the client device(s) 102 transmit an indication to the server(s) 110 that the UAV 106 has begun the mission plan at the site. Moreover, the digital UAV positioning system 100, via the UAV 106, receives satellite signal(s) 116 from the satellite system(s) 112, identifies phase measurement(s) of the satellite signals(s) 116 and transmits the phase measurement(s) and signal data to the client device(s) 102. Further, the base station 104 receives satellite signal(s) 116 from the satellite system(s) 112 (which may include one or more dual-frequency satellite signals), identifies phase measurement(s) of the satellite signal(s), and transmits the base station phase measurement(s) and base station signal data to the client device(s) 102. Furthermore, the server(s) 110 obtain PPP correction data from the satellite system(s) 112, and provide the PPP correction data to the client device(s) 102. The client device(s) 102 use the base station satellite signal data and the PPP correction data to determine the absolute position of the base station 104. The client device(s) 102 may then, based on received phase measurements and satellite signal data from the base station 104 and the UAV 106, calculate the relative positions of the base station 104 and the UAV 106.

Further, the client device(s) 102 may determine the absolute position of the UAV 106 based on the absolute position of the base station 104 and the relative positions of the UAV 106 and the base station 104.

Figure 2:
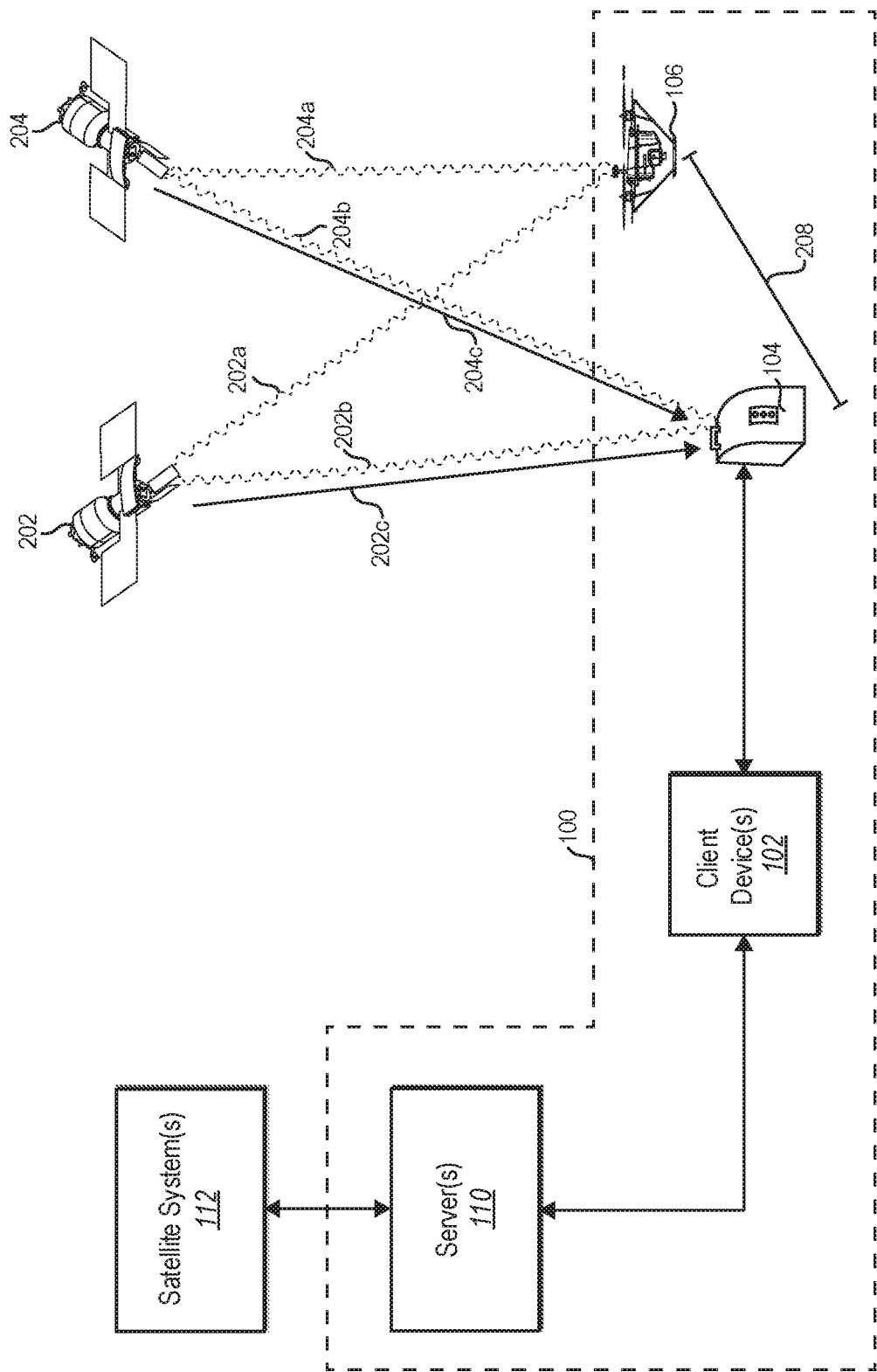
FIG. 2 illustrates a representation of satellites, a base station, a UAV, a client device, a server, and a satellite system in accordance with one or more embodiments.

As mentioned, in one or more embodiments, the digital UAV positioning system 100 utilizes real time kinematic techniques and precise point positioning techniques to identify a position of a UAV. FIG. 2 illustrates identifying a position of a UAV utilizing real time kinematic satellite navigation, in accordance with one or more embodiments of the digital UAV positioning system 100. In particular, FIG. 2 illustrates the UAV 106, the base station 104, a first satellite 202, and a second satellite 204.

In one or more embodiments, users of the digital UAV positioning system 100 place the base station 104 in the vicinity of the UAV 106. For example, in one or more embodiments users place the base station 104 near the site of a flight mission (e.g., within 10 km) to produce accurate position data. Indeed, as mentioned above, in one or more embodiments, a user can place the base station 104 and operate the UAV 106 and the digital UAV positioning system 100 can automatically determine UAV positions (e.g., by simply pushing a button on the base station 104, without having to survey ground control points, survey a location of the base station, or otherwise depend on user conduct to determine position data).

The first satellite 202 and the second satellite 204 comprise satellites transmitting signals to Earth (e.g., satellite signals and/or dual frequency signals for navigation or determining the position of an object on the Earth). For example, the satellites 202, 204 can transmit a variety of signals, including satellite signals and/or dual frequency signals transmitting pseudorandom noise codes and/or time data. For example, as illustrated in FIG. 2, the first satellite 202 transmits a signal 202*a* received by the UAV 106 and a signal 202*b* received by the base station 104. Additionally, the first satellite 202 transmits a dual frequency signal 202*c* received by the base station 104. Similarly, the second satellite 204 transmits a signal 204*a* received by the UAV 106 and a signal 204*b* received by the base station 104. Additionally, the second satellite 204 transmits a dual frequency signal 202*c* received by the base station 104.

Although FIG. 2 shows each of the satellite signals 202*a*-204*c* as distinct, it will be appreciated that the signals may not be distinct. For example, the dual frequency signals 202*c*, 204*c* may be the same as the signals 202*b*, 204*b* received at the base station 104. Additionally, although FIG. 2 illustrates two satellites 202, 204, it will be appreciated that the digital UAV positioning system 100 can utilize fewer or additional satellites (e.g., five satellites transmitting five signals).

Moreover, although the first satellite 202 and the second satellite 204 are illustrated as separate from the satellite system(s) 112, as described above, in one or more embodiments, the satellite system(s) 112 include the satellites 202, 204. Indeed, the satellite system(s) 112 can include satellites as well as remote servers that manage information regarding one or more orbiting satellites.

As mentioned briefly above, the atmosphere can alter transmission of a signal from a satellite and thus produce inaccurate position measurements. Similarly, a satellite clock can have inaccuracies that can affect the precision of resulting position measurements. The digital UAV positioning system 100 uses two techniques to eliminate inaccuracies in position readings for the base station 104 and the UAV 106.

In particular, the digital UAV positioning system 100 can utilize precise point positioning ("PPP") to account for inaccuracies in position measurements. For example, PPP techniques account for atmospheric interference by dual-frequency operation, which can eliminate inaccuracies caused by some atmospheric interference. PPP techniques can also reduce error by use of precise point position correction data ("PPP correction data"), which includes satellite orbit and clock corrections, to increase location accuracy. Additionally, PPP techniques can be implemented by use of a PPP filter algorithm (e.g., an Extended Kalman Filter) that can incorporate dual-frequency signal data and PPP correction data to improve position accuracy. The PPP filter algorithm may improve accuracy by minimizing noise in the system and taking many GNSS measurements until there is a sufficient convergence. Thus, by utilizing PPP correction data, dual-frequency signals, and a PPP filter algorithm, PPP techniques can determine position with centimeter accuracy. Specifically, in one or more embodiments, the base station 104 receives PPP correction data from the satellite system(s) 112. The PPP data may be transmitted from the satellite system(s) 112 to the server(s), to the client device(s) 102, and to the base station 104, either directly or indirectly through the network 108. PPP correction data may include ephemeris data, such as satellite clock data, satellite position data, and satellite health data. The base station 104 may utilize dual-frequency satellite signals 202c, 204c and the PPP correction data to calculate the accurate absolute position of the base station 104.

Additionally, as mentioned briefly above, the digital UAV positioning system 100 can utilize real time kinematic ("RTK") techniques to generate precise position data. In particular, the technique is based on measurements of a satellite signal by a rover device (e.g., a UAV) and RTK correction data from one or more reference stations (i.e., base stations with a known location). Specifically, the technique determines a position of the rover device (e.g., the UAV) by determining the number of wave lengths in a satellite signal between the satellite and the rover device (e.g., multiplying the number of wave lengths by the wave length to calculate a distance to the satellite). The technique utilizes the RTK correction data to account for errors and inaccuracies that result from a single measurement of the signal.

To illustrate, in one or more embodiments, the digital UAV positioning system 100 utilizes an absolute position of the base station 104 and the satellite signals 202b, 204b to generate RTK correction data. Specifically, the digital UAV positioning system 100 utilizes the absolute position of the base station 104 (generated utilizing PPP correction data) and compares phase measurements of the satellite signals 202b, 204b to generate RTK correction data 206 (which it may send to the UAV 106 and/or the client device(s) 102). Then, the digital UAV positioning system 100 may utilize phase measurements of the satellite signals 202a, 204a received at the UAV with the RTK correction data generated by and received from base station 104 to calculate a number of wavelengths between the UAV and satellite 204. Furthermore the digital UAV positioning system 100 can, based on the number of wavelengths, calculate a relative position 208 between the absolute location of the base station 104 and the UAV 106. This process of identifying an integer number of wavelengths is referred to as ambiguity resolution or resolving integer ambiguity.

More particularly, in one or more embodiments, the digital UAV positioning system 100 utilizes one or more algorithms to calculate a position of the UAV 106 based on a satellite signal received by the UAV 106 and RTK correction data received from the base station 104. Specifically, in one or more embodiments, the digital UAV positioning system 100 utilizes the set of algorithms identified as the RTKLIB Open Source Program Package For GNSS Positioning for generating UAV position data based on a satellite signal from the UAV 106 and RTK correction data from the base station 104. In addition to RTKLIB, the digital UAV positioning system 100 can utilize a variety of algorithms for generating UAV position data based on a satellite signal from the UAV 106 and RTK correction data from the base station 104.

It will be appreciated that although FIG. 2 depicts a single base station 104, in one or more embodiments, the digital UAV positioning system 100 can utilize multiple base stations. Moreover, although not illustrated in relation to FIG. 2, it will be appreciated that in one or more embodiments, the digital UAV positioning system 100 can synchronize time between or among the satellites 202, 204, the base station 104, and the UAV 106. Indeed, in one or more embodiments, the digital UAV positioning system 100 includes a flight controller that includes a real-time operating system that can guarantee precise timing to microseconds. For instance, as mentioned above, the UAV 106 can include a flight controller clock that synchronizes with times tracked by each of the satellites 202, 204. For example, the UAV 104 can synchronize the flight controller clock to periodic time transmissions embedded in the satellite signals 202a-c, 204a-c. Similarly, the base station can synchronize RTK correction data with times transmitted by each of the satellites 204, 206. In this manner, the digital UAV positioning system 100 can align RTK correction data with information regarding a satellite signal received by a UAV to more accurately calculate a precise position of the UAV.

It will be appreciated that the digital UAV positioning system 100 can calculate a position of the UAV 106 in real-time during a flight mission or via post-processing after a flight mission. Identifying a position of the UAV 106 in real-time during a flight mission allows the digital UAV positioning system 100 to assist the UAV 106 in flight. For example, the UAV positioning system may calculate the position of the UAV 106 during flight, allowing the UAV to utilize a calculated position to perform various flight mission tasks. To illustrate, the UAV positioning system 100 can utilize the calculated position of the UAV 106 (and corresponding camera positions) in flight to generate a three-dimensional representation of a site during a flight mission of the site. Specifically, the UAV positioning system 100 can utilize calculated positions of the UAV 106 (i.e., positions of a camera when the UAV 106 captures digital images of a site) as part of a structure from motion and/or bundle adjustment algorithm that generates a three-dimensional model from digital images captured by the UAV 106). Similarly, the UAV positioning system 100 can utilize calculated positions of the UAV 106 to more accurately navigate the UAV 106 in flight.

Figure 3:
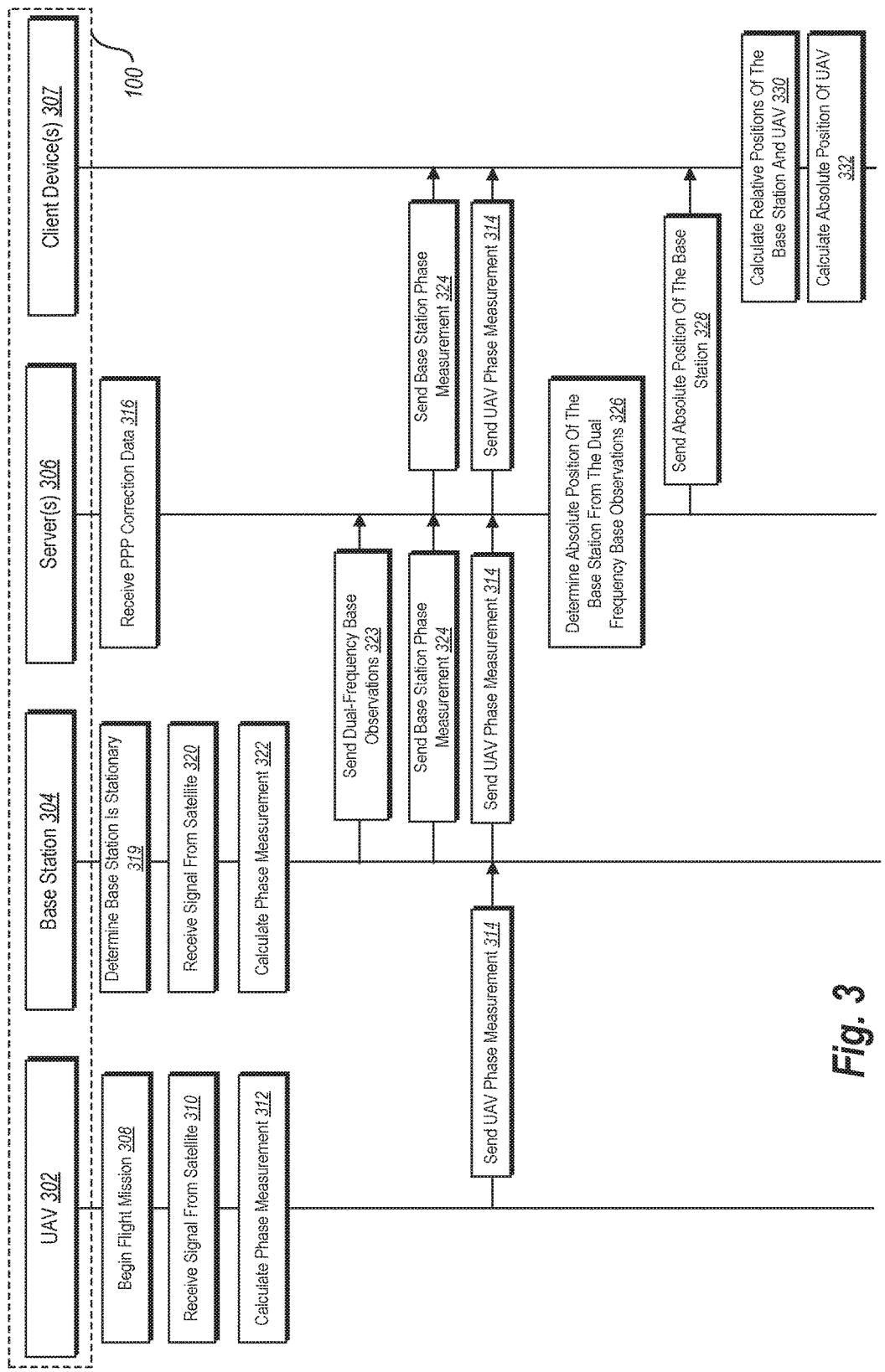
FIG. 3 illustrates a schematic diagram comprising a plurality of steps in a method of determining the position of a UAV.

Turning now to FIG. 3, additional detail will be provided regarding a method of determining the location of a UAV in flight in accordance with one or more embodiments of the digital UAV positioning system 100. In particular, FIG. 3 illustrates a method 300 comprising a plurality of steps 302-332 performed by the UAV positioning system 100 utilizing a UAV 302, server(s) 306, a base station 304, and client device(s) 307. In particular, as discussed in more detail below, the digital UAV positioning system 100 can include computer-executable instructions that, when executed by the UAV 302 (i.e., an exemplary embodiment of the UAV 106), the server(s) 306 (i.e., an exemplary embodiment of the server(s) 110), the base station 304 (i.e., an exemplary embodiment of the base station 104), and the client device(s) 307 (i.e., an exemplary embodiment of the client device(s) 102) cause the UAV 302, the server(s) 306, the base station 304, and the client device(s) 307 to perform the steps 302-332 shown in the sequence diagram of FIG. 3.

As shown in FIG. 3, the method 300 includes the step 308 of beginning a flight mission. In particular, the step 308 can include setting up and preparing the UAV 302 for flight. To illustrate, the step 308 can include transporting the UAV 302 to a site, setting up the UAV 302 at the site, connecting the UAV 302 to a network of other computing devices (e.g., establishing a Bluetooth connection to the client device(s) 307 and/or the base station 304 or establishing a network connection to the server(s) 306 via the Internet), initiating flight systems or guidance systems of the UAV 302, starting a motor and/or rotors of the UAV 302, launching the UAV 302 from the ground, and/or capturing a digital aerial image utilizing a camera affixed to the UAV 302.

Moreover, as shown in FIG. 3, the UAV 302 can also perform the step 310 of receiving a signal from a satellite. Indeed, as mentioned above, the UAV 302 can receive a satellite signal transmitted by an orbital satellite. Moreover, in one or more embodiments, the UAV may receive one or more satellite signals from one or more satellites.

As illustrated in FIG. 3, upon receiving a signal from a satellite, the UAV 302 also performs the step 312 of calculating a phase measurement of the received satellite signal. For example, the step 312 may include measuring the frequency (or waveform) of the signal received from the satellite over time. Moreover, the step 312 can include synchronizing a flight controller clock with a time transmission signal from a satellite. The calculation may also include utilizing the satellite signal transmitted by the satellite, determining the exact number of wavelengths between the origin of the signal on the satellite and the GPS receiver or GPS antenna on the UAV 302. Upon determining the phase measurement of a satellite signal, the UAV 302 may perform step 314 of sending the phase measurement to the server(s) 306 and/or to the client device(s) 307.

As shown in FIG. 3, the server(s) 306 may also perform the step 316 of receiving PPP correction data. PPP correction data may comprise satellite ephemeris data such as satellite clock data, satellite position data, and satellite health data. The PPP correction data may be received from a satellite system (e.g. satellite system(s) 112) or from another source. To illustrate, in one or more embodiments, the digital UAV positioning system 100 can obtain PPP correction data from IGS.

As illustrated in FIG. 3, the base station 304 may perform the step 319 of determining that the base station is stationary. As discussed previously, in one or more embodiments, the base station 304 includes an accelerometer. The base station may use this accelerometer to determine whether the base station 304 is stationary (or in motion). The digital UAV positioning system 100 may display whether the base station 304 is stationary on the client device(s) 307. Further, the digital UAV positioning system 100 may delay or stop flight mission tasks based on whether or not the base station 304 is stationary.

For example, if the base station 304 is in motion, the digital UAV positioning system 100 can delay receiving a signal from a satellite and/or calculating phase measurement (and/or any of the acts 310, 312, 314, 320, 322, 323, 324, 324, 326, 328, 330, or 332) until the base station 304 is stationary. Additionally, the digital UAV positioning system 100 may present a notification on the client device(s) 307 if the base station 304 moves unexpectedly during a flight mission or task. Similarly, if the digital UAV positioning system 100 determines that the base station 304 is in motion during a flight mission, the digital UAV positioning system 100 can stop one or more functions or acts (e.g., any of the acts 310, 312, 314, 320, 322, 323, 324, 324, 326, 328, 330, or 332). In particular, the digital UAV positioning system 100 can stop one or more functions or acts until the base station 304 is stationary for a threshold period of time (or until the base station 304 is able to accurately obtain PPP data or accurately determine position information).

Additionally, as illustrated by FIG. 3, the base station 304 may perform step 320 of receiving a signal from a satellite. Indeed, as mentioned above, the base station 304 may receive any number of signals from any number of satellites, and any number of the signals received may comprise dual frequency signals. Upon receiving dual-frequency signals, the base station may perform step 323 of sending dual-frequency base observations to the server(s) 306 and/or the client device(s) 307.

As shown in FIG. 3, upon receiving a signal from a satellite, the base station 304 performs step 322 of measuring the phase measurement of a received satellite signal. The step 322 may include synchronizing a flight controller clock with a time transmission signal from a satellite. The calculation may also include utilizing the satellite signal transmitted by the satellite and determining the exact number of wavelengths between the origin of the signal on the satellite and the GPS receiver or GPS antenna on the base station 304. Upon calculating the phase measurement of a satellite signal, the base station 304 may perform step 324 of sending the base station phase measurement to the server(s) 306.

As illustrated in FIG. 3, the server(s) 306 may also perform the step 326 of determining the absolute position of the base station from the dual frequency base observations. In particular, the step 326 can include utilizing PPP correction data and the dual frequency base observations to determine the absolute position of the base station 304. Specifically, the digital UAV positioning system 100, via the server(s) 306, can utilize a PPP filter algorithm to analyze the PPP correction data and dual frequency base observations.

In one or more embodiments, the server(s) 306 can determine the absolute position of the base station 304 by sending dual-frequency base observations to a global PPP correction service. Upon sending dual-frequency base observations to a global PPP correction service, the server(s) 306 may perform the step 326 of receiving the absolute position of the base station from the global PPP correction service. As shown in FIG. 3, upon determining the absolute position of the base station, the server(s) 306 may perform step 328 of sending the absolute position of the base station to the client device(s) 307.

In addition, as mentioned above, the digital UAV positioning system 100 can also determine an absolute position of the UAV 302 in flight. Indeed, as shown in FIG. 3, upon receiving the phase measurements from the UAV 302 and the base station 304, the client device(s) 307 may perform step 330 of calculating the relative positions of the base station 304 and the UAV 302. In particular, based on the phase measurements of the received signals at both the UAV and the base station, the client device(s) 307 may calculate the relative positions of the base station 304 and the UAV 302. Specifically, the client device(s) 307 may, based on the phase measurements from the UAV 302 and the base station 304, generate RTK correction data. Additionally, the client device(s) 307 may, based on the generated RTK correction data and the phase measurements, calculate the relative positions of the base station 304 and the UAV 302.

As shown in FIG. 3, upon calculating the relative positions of the base station 304 and the UAV 302, the client device(s) 307 also performs the step 332 of calculating the absolute position of the UAV 302. Based on the relative positions of the base station 304 and the UAV 302 and the absolute position of the base station 304, client device(s) 307 may calculate the absolute position of the UAV 302. For example, if the digital UAV positioning system 100 calculates the position of the UAV 302 relative to the base station 304 as (+0.5° N, +1.0° E, +4.5 m) (i.e., based on phase measurements from the UAV and base station and RTK correction data) and determines the absolute position of the base station 304 is (40.86° N, 111.90° W, 1,292 m) (i.e., based on PPP correction data and dual frequency base observations), then the digital UAV positioning system 100 can calculate the absolute position of the UAV 302 as (41.36° N, 110.90° W, 1,296.5 m).

After determining the absolute position of the UAV 302, the digital UAV positioning system 100 can then utilize the absolute position. For example, the digital UAV positioning system 100 can utilize the absolute position to determine the position of a camera affixed to the UAV at a time when the camera captures a digital image. The digital UAV positioning system 100 can then utilize the absolute position of the camera to generate a three-dimensional model utilizing a plurality of digital images. Similarly, the digital UAV positioning system 100 can utilize the absolute position to navigate the UAV in flight.

The method described in relation to FIG. 3 is intended to be illustrative of one or more methods in accordance with the present disclosure, and is not intended to limit potential embodiments. Alternative embodiments can include additional, fewer, or different acts than those articulated in FIG. 3. For instance, although FIG. 3 illustrates a single series of individual acts, any number of these acts may be repeated during a flight mission or task. For example, it may be necessary to determine the position of the UAV at various times during a flight mission or task (e.g., at regular time intervals or at each time a camera device captures a digital image), and many steps of method 300 may be repeated during a flight mission or task.

Additionally, the acts described herein may be performed in a different order, may be repeated or performed in parallel with one another, or may be performed in parallel with different instances of the same or similar acts. Moreover, the methods described in relation to FIG. 3 may be performed with less steps/acts or more steps/acts, and the steps/acts may be performed in differing orders or by different devices. For example, steps illustrated in relation to FIG. 3 as being performed by the base station 304 can be performed by the server(s) 306 (or vice versa). Thus, the steps illustrated in FIG. 3 can be performed by any of the UAV 302, the base station 304, the server(s) 306, and/or the client device(s) 307.

For example, FIG. 3 illustrates the server(s) 306 performing the act 326 of determining the absolute position of the base station. In one or more embodiments, the server(s) 306 can perform an additional act of sending the PPP correction data to the client device(s) 307 and the client device(s) 307 can perform the act 326 of determining the absolute position of the base station.

Similarly, the acts 330 and 332 are illustrated in FIG. 3 as being performed by the client device(s) 307, but can be performed by the server(s) 306, the base station 304, and/or the UAV 302. For instance, the server(s) 306 can calculate the relative position of the base station and the UAV and/or determine the absolute position of the UAV.

Furthermore, although FIG. 3 illustrates the base station 304 performing the act 319 of determining that the base station is stationary, in one or more embodiments, the act 319 is performed by other computing devices. For example, in one or more embodiments, the UAV 302, the server(s) 206, and/or the client device(s) 307 perform the act 319 upon receiving acceleration data from the base station 304.

Moreover, in one or more embodiments, the digital UAV positioning system 100 can determine the accuracy of position calculations in real-time. For example, the digital UAV position system 100 can utilize the client device(s) 307, the base station 304, and/or the UAV 302 to determine the accuracy of position calculations and/or modify flight of the UAV 302 in real time. For example, the digital UAV positioning system can determine whether it has a fixed (i.e., more accurate) calculation of the number of wavelengths in a signal transmitted from a satellite or whether it has a floating (i.e., less accurate) calculation of the number of wavelengths.

To illustrate in relation to FIG. 3, the digital UAV positioning system 100 can provide the base station phase measurements to the UAV 302. The UAV 302 can determine, in real-time, whether it has a fixed or floating calculation of the number of wavelengths between the UAV 302 and a satellite transmitting satellite signals. Moreover, the UAV 302 can provide an indication to the client device(s) 307 regarding the fixed or floating calculating (and the client device(s) 307 can provide a user interface indicator for display). A user of the client device(s) 307 can then modify operation of the UAV 302 (or the digital UAV positioning system 100 can automatically modify operation of the UAV 302) based on the indicated quality of the calculations. For example, the digital UAV positioning system 100 can delay or stop capturing digital aerial images until determining a fixed calculating of wavelengths.

Figure 4:
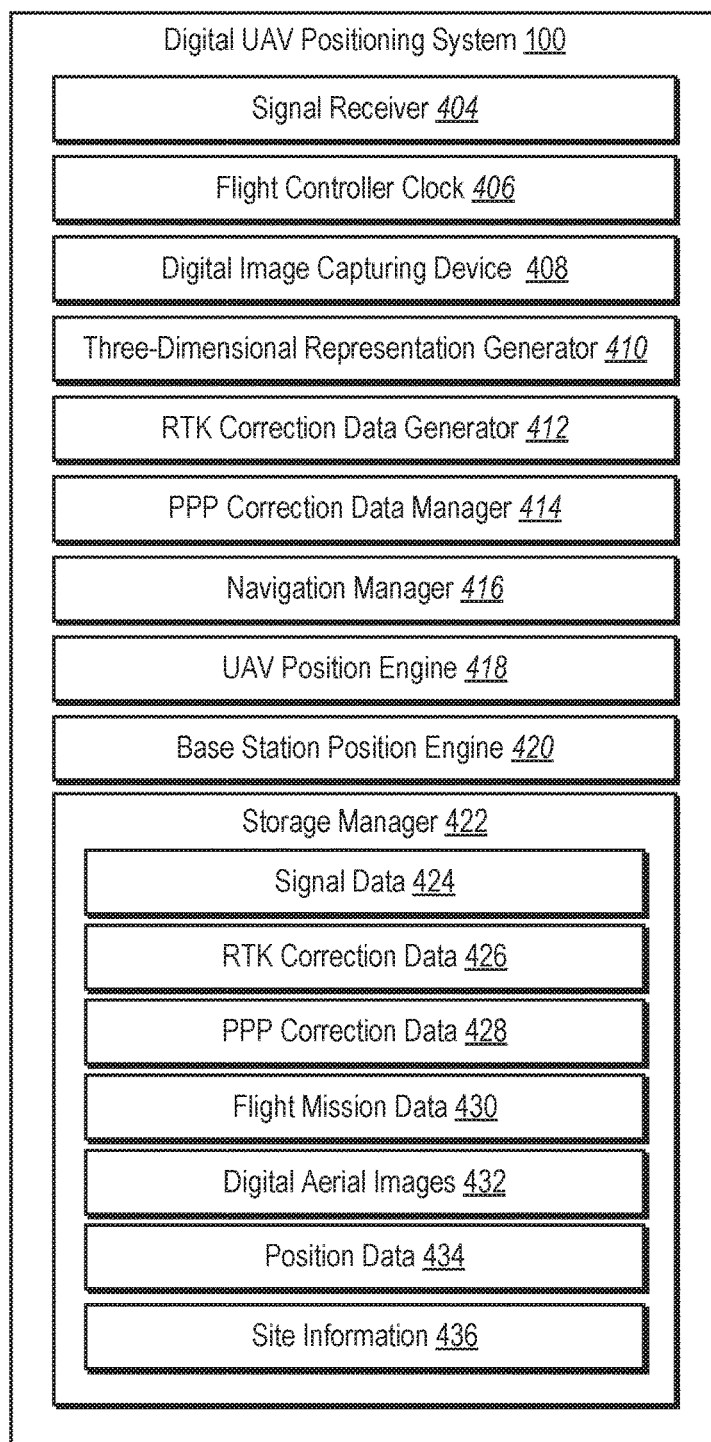
FIG. 4 illustrates a flowchart of a series of acts in a method of determining the position of a UAV.

Turning now to FIG. 4, additional detail will be provided regarding components and capabilities of one or more embodiments of the digital UAV positioning system 100. In particular, FIG. 4 shows a schematic diagram illustrating an example embodiment of the digital UAV positioning system 100. As shown in FIG. 4, in one or more embodiments, the digital UAV positioning system 100 includes a signal receiver 404, a flight controller clock 406, a digital image capturing device 408, a capture time facility 410, a three-dimensional representation generator 412, a three-dimensional representation manager 414, an RTK correction data generator 416, an RTK correction data manager 418, a PPP correction data manager 420, a signal wavelength counter 422, a navigation manager 424, a communications manager 426, a position engine 428, and a UAV position system storage manager 430 (comprising signal data 432, RTK correction data 434, PPP correction data 436, flight mission data 438, digital aerial images 440, position data 442, and site information 444).

As mentioned above, individual components of the digital UAV positioning system 100 can be implemented by different devices. For example, the client device(s) 102, the base station 104, the UAV 106, and/or the server(s) 110 can implement all or a portion of the components 404-420. To illustrate, in some embodiments, the base station 104 and the UAV 102 can implement the signal receiver 404 and the flight controller clock 406. The UAV can implement the digital image capturing device 408. The client device(s) 102 can implement the three-dimensional representation generator 410, the RTK correction data generator 412, the navigation manager 416, the UAV position engine 418, and/or the base station position engine 420. Moreover, the server(s) 112 can implement the PPP correction data manager 414, and the storage manager 422. Although the foregoing example illustrates one potential arrangement of the components 404-422, the digital UAV positioning system 100 can implement the components 404-422 across any of the client device(s) 102, the base station 104, the UAV 106, and/or the server(s) 110.

As just mentioned, and as illustrated in FIG. 4, the UAV positioning system 402 includes the signal receiver 404 (e.g., a GPS receiver). The signal receiver 404 can identify, receive, accept, collect, gather, and/or convert one or more signals transmitted by a satellite. In particular, as previously discussed, the signal receiver 404 can receive a satellite signal and/or a dual frequency signal transmitted by a satellite of a global navigation satellite system.

Moreover, as shown in FIG. 4, the digital UAV positioning system 100 includes the flight controller clock 406. The flight controller clock 406 can identify, record, determine, synchronize, and/or identify one or more times. In particular, as discussed, the flight controller clock can synchronize with a time signal transmitted by a satellite. Moreover, the flight controller clock 406 can utilize the synchronized time to identify a time corresponding to a position of a UAV or a base station.

In addition, as illustrated in FIG. 4, the digital UAV positioning system 100 includes the digital image capturing device 408 (e.g., a digital camera). The digital image capturing device 408 can capture one or more digital aerial images. In particular, as discussed previously, the digital image capturing device 408 can capture a digital aerial image of a site during a flight mission of a UAV (e.g., the UAV 106, the UAV 302).

As shown in FIG. 4, the digital UAV positioning system 100 also includes the three-dimensional representation generator 410. The three-dimensional representation generator 410 can create, calculate, and/or generate one or more three-dimensional representations. In particular, as described above, the three-dimensional-representation generator 410 can generate a three-dimensional representation based on a plurality of digital aerial images and corresponding positions of the digital image capturing device 408 at times when the plurality of digital aerial images were captured.

Moreover, as illustrated in FIG. 4, the digital UAV positioning system 100 also includes the RTK correction data generator 412. The RTK data correction data generator 412 can calculate, receive, identify and/or obtain RTK correction data. For example, the RTK correction data generator 412 may generate RTK correction data via analysis of signals received from a satellite (e.g. satellites 202, 204) at a base station (e.g. base station 104, 306) and at a UAV (e.g. UAV 106, 302). Additionally, the RTK correction data manager 412 can obtain RTK correction data from a server (e.g., the server(s) 306). Similarly, the RTK correction data manager 418 can receive RTK correction data from one or more base stations or other components of the UAV positioning system.

Similarly, as illustrated in FIG. 4, the digital UAV positioning system 100 also includes the PPP correction data manager 414. The PPP correction data manager 420 can receive, identify, generate, create, and/or obtain PPP correction data. For example, the PPP correction data manager 414 can obtain PPP correction data from a local server (e.g., the server(s) 306) or from a third-party server (e.g., StarFie, VERIPOS, INS, or TerraStar).

Moreover, as illustrated in FIG. 4, the digital UAV positioning system 100 also includes the navigation manager 416. The navigation manager 416 can guide, navigate, control and/or direct a UAV (e.g., the UAV 302). In particular, the navigation manger 416 can control flight components (e.g., motors and rotors) of a UAV to navigate the UAV. The navigation manager 416 can direct the UAV based on position data (e.g., position data calculated by the UAV position engine 418 or the base station position engine 420).

As shown in FIG. 4, the digital UAV positioning system 100 also includes the UAV position engine 418. The UAV position engine 418 can determine, identify, calculate, and/or generate the position of a UAV (e.g., the UAV 106, 302). For example, the UAV (e.g., the UAV 106, 302) can transmit to the server (e.g., the server(s) 306) satellite signal data received at the UAV, and a base station (e.g., the base station 104, 306) may transmit satellite signal data received at the base station. The UAV position engine 418 may generate the position of the UAV relative to the base station based on the received satellite signal data and corresponding RTK correction data. In addition, the UAV position engine 418 can calculate the absolute position of the UAV based on the position of the UAV relative to the UAV and the absolute position of the base station, which may be received from the digital UAV positioning system 100.

Additionally, as shown in FIG. 4, the digital UAV positioning system 100 also includes the base station position engine 420. The base station position engine 420 can determine, identify, calculate, and/or generate the position of a base station (e.g., the base station 104, 306). For example, the base station (e.g., the base station 104, 306) can transmit to the server (e.g., the server(s) 306) satellite signal data received at the base station and generate the position of the UAV relative to the base station based on the satellite signal data and corresponding PPP correction data, using PPP techniques previously described.

Further, as shown in FIG. 4, the digital UAV positioning system 100 also includes the storage manager 422. The storage manager 422 maintains the data for the digital UAV positioning system 100. The storage manager 422 can maintain data of any type, size, or kind, as necessary to perform the functions of the digital UAV positioning system 100, including signal data 424 (e.g., carrier signal data, phase measurements, other satellite signal data), RTK correction data 426, PPP correction data 428 (e.g., ephemeris data, satellite clock data, satellite orbit data, satellite health data), flight mission data 430 (e.g., flight paths, site parameters, mission instructions), digital aerial images 432 (e.g., digital taken by the UAV), position data 434 (e.g., UAV position data, base station position data), and site information 436 (e.g., site coordinates, site landmark data).

Each of the components 404-436 of the digital UAV positioning system 100 and their corresponding elements may be in communication with one another using any suitable communication technologies. It will be recognized that although components 404-436 are shown to be separate in FIG. 4, any of components 404-436 may be combined into fewer components (such as into a single component), divided into more components, or configured into different components as may serve a particular embodiment. Moreover, one or more embodiments of the digital UAV positioning system 100 may include additional components or fewer components than those illustrated in FIG. 4.

The components 404-436 and their corresponding elements can comprise software, hardware, or both. For example, the components 404-436 and their corresponding elements can comprise one or more instructions stored on a computer-readable storage medium and executable by processors of one or more computing devices. When executed by the one or more processors, the computer-executable instructions of the digital UAV positioning system 100 can cause one or more computing systems (e.g., one or more server devices) to perform the methods and provide the functionality described herein. Alternatively, the components 404-436 can comprise hardware, such as a special purpose processing device to perform a certain function or group of functions. Moreover, the components 404-436 can comprise a combination of computer-executable instructions and hardware.

Furthermore, the components 404-436 of the digital UAV positioning system 100 and their corresponding elements may, for example, be implemented as one or more stand-alone applications, as one or more modules of an application, as one or more plug-ins, as one or more library functions or functions that may be called by other applications, and/or as a cloud-computing model. Thus, components 404-436 of the digital UAV positioning system 100 and their corresponding elements may be implemented as one or more stand-alone applications, such as a desktop or mobile application. Furthermore, the components 404-436 of the digital UAV positioning system 100 may be implemented as one or more web-based applications hosted on a remote server. Moreover, the components of the digital UAV positioning system 100 may be implemented in a suite of mobile device applications or "apps."

Figure 5:
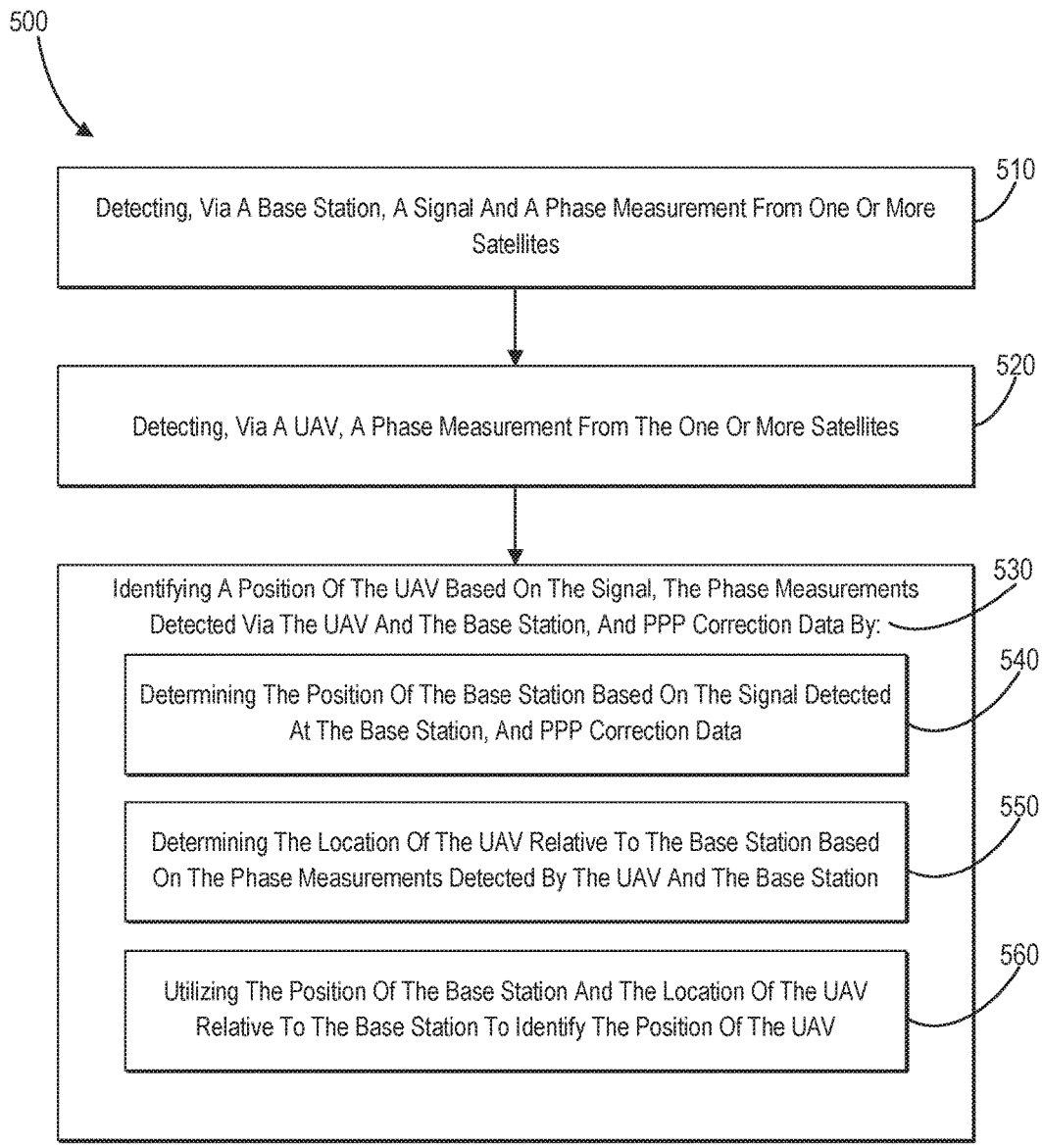
FIG. 5 illustrates a schematic diagram of a network environment in which the methods and systems disclosed herein may be implemented in accordance with one or more embodiments.

FIGS. 1-4, the corresponding text, and the examples, provide a number of different systems and devices for determining position of a UAV in flight. In addition to the foregoing, one or more embodiments can also be described in terms of flowcharts comprising acts and steps in a method for accomplishing a particular result. For example, FIG. 5 illustrates flowcharts of exemplary methods in accordance with one or more embodiments. The methods described in relation to FIG. 5 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of an example method 500 of determining a position of a camera affixed to a UAV at a time of capturing a digital aerial image in accordance with one or more embodiments. As illustrated, the method 500 includes an act 510 of detecting, via a base station, a signal, and a phase measurement from one or more satellites (e.g., satellites 202, 204). In particular, the act 510 can comprise detecting, via a base station, one or more signals transmitted from one or more satellites to the base station and a first phase measurement of a first signal from the one or more signals transmitted from the one or more satellites to the base station. More particularly, the act 510 can comprise detecting a dual-frequency signal at a dual-frequency receiver and a dual frequency antenna at a base station (e.g., a base station 306. The act 510 can further comprise calculating a phase measurement of the dual-frequency signal or receiving a separate satellite signal from the satellites 202, 204 and calculating its phase measurement. As previously mentioned, any number of satellite signals can be received from any number of satellites. Additionally, as previously mentioned, the digital UAV positioning system 100 may calculate the phase measurements from the one or more satellites at any capable component of the UAV positioning system 402. In one or more embodiments, the base station comprises a dual frequency receiver, and identifying the first position of the UAV is further based on combinations of dual frequency measurements to remove an ionospheric effect on at least one of the one or more signals transmitted from the one or more satellites to the base station.

Moreover, in one or more embodiments, the base station (e.g., the base station 304) includes a dual frequency GPS receiver and the UAV (e.g., the UAV 302) includes a GPS receiver. In addition, the act 510 can include fixing the number of full wavelengths between a GPS receiver and the satellite.

As illustrated in FIG. 5, the method 500 also includes the act 520 of detecting, via a UAV, a phase measurement from one or more satellites. In particular, the act 520 can comprise detecting, by a UAV in flight at a first position, a second phase measurement of a second signal transmitted from the one or more satellites to the UAV. Specifically, the act 520 can include receiving a satellite signal from a satellite (e.g., satellites 202, 204) at a GPS receiver at the UAV 302 and determining its phase measurement (e.g., its frequency or wave form). As previously mentioned, this calculation may be performed at any capable component of the UAV positioning system 100.

As shown in FIG. 5, the method 500 also includes the act 530 of identifying a position of the UAV based on the signal, the phase measurements detected by the UAV and the base station, and PPP correction data. More specifically, the act 530 may comprise identifying the first position of the UAV in flight based on the one or more signals identified by the base station, PPP correction data, the phase measurement of the first signal transmitted from the one or more satellites to the base station, and the second phase measurement of the second signal transmitted from the one or more satellites to the UAV. For instance, the act 530 can include identifying the first position of the UAV based on the one or more signals identified by the base station, PPP correction data, the phase measurement of the first signal transmitted from the one or more satellites to the base station, and the second phase measurement of the second signal transmitted from the one or more satellites while the UAV is in flight. Moreover, in one or more embodiments, the act 530 includes identifying the first position of the UAV in flight based on the second phase measurement of the second signal without accessing RTK correction data from an RTK network.

As illustrated in FIG. 5, the act 530 may also include the acts 540, 550, and 560. For example, in one or more embodiments, the act 530 includes the act 540 of determining the position of the base station based on the signal detected at the base station and PPP correction data. More specifically, the act 540 may comprise determining a position of the base station utilizing the signal identified by the base station and the PPP correction data. As mentioned above, the signal identified by the base station in act 510 may include dual-frequency signal data, and PPP correction data may be received from the satellite system(s) 112. The digital UAV positioning system 100 may calculate the absolute position of the base station by use of data from received satellite signals, and by correcting for atmospheric interference by use of PPP correction data in combination with the dual-frequency signal. The digital UAV positioning system 100 may perform act 540 by use of precise point positioning techniques as described above.

As shown in FIG. 5, the act 530 also includes the act 550 of determining the location of the UAV relative to the base station based on the phase measurements detected by the UAV and the base station. More specifically the act 550 may comprise determining a location of the UAV relative to the base station utilizing the second signal emitted from the one or more satellites to the UAV and RTK correction data generated based on the phase of the first signal transmitted from the one or more satellites to the base station. The act 550 may also include generating RTK correction data based on one or more satellite signals received at the base station (e.g., the base station 104, 306) and the UAV (e.g., the UAV 106, 302). For example, in one or more embodiments, the RTK correction data indicates a correction for the second signal emitted from the one or more satellites caused by atmospheric effects The digital UAV positioning system 100 may utilize real time kinematic techniques, as described above, to determine the relative locations of the UAV and the base station.

As illustrated in FIG. 5, the act 530 also includes act 560 of utilizing the position of the base station and the location of the UAV relative to the base station to identify the position of the UAV. More specifically act 560 may comprise utilizing the position of the base station and the location of the UAV relative to the base station to identify the first position of the UAV in flight. Thus, by performing acts 540, 530, and 560, the digital UAV positioning system 100 may identify the absolute position of the UAV based on satellite signals and phase measurements received at the base station 304 and the UAV 302 and PPP correction data.

The method 500 can also include receiving digital images of a site captured by the UAV in flight; and generating a three-dimensional model of the site based on the digital images and the identified first position of the UAV. Moreover, the method 500 can also include, receiving the PPP correction data, wherein the PPP correction data comprises ephemeris data of the one or more satellites Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
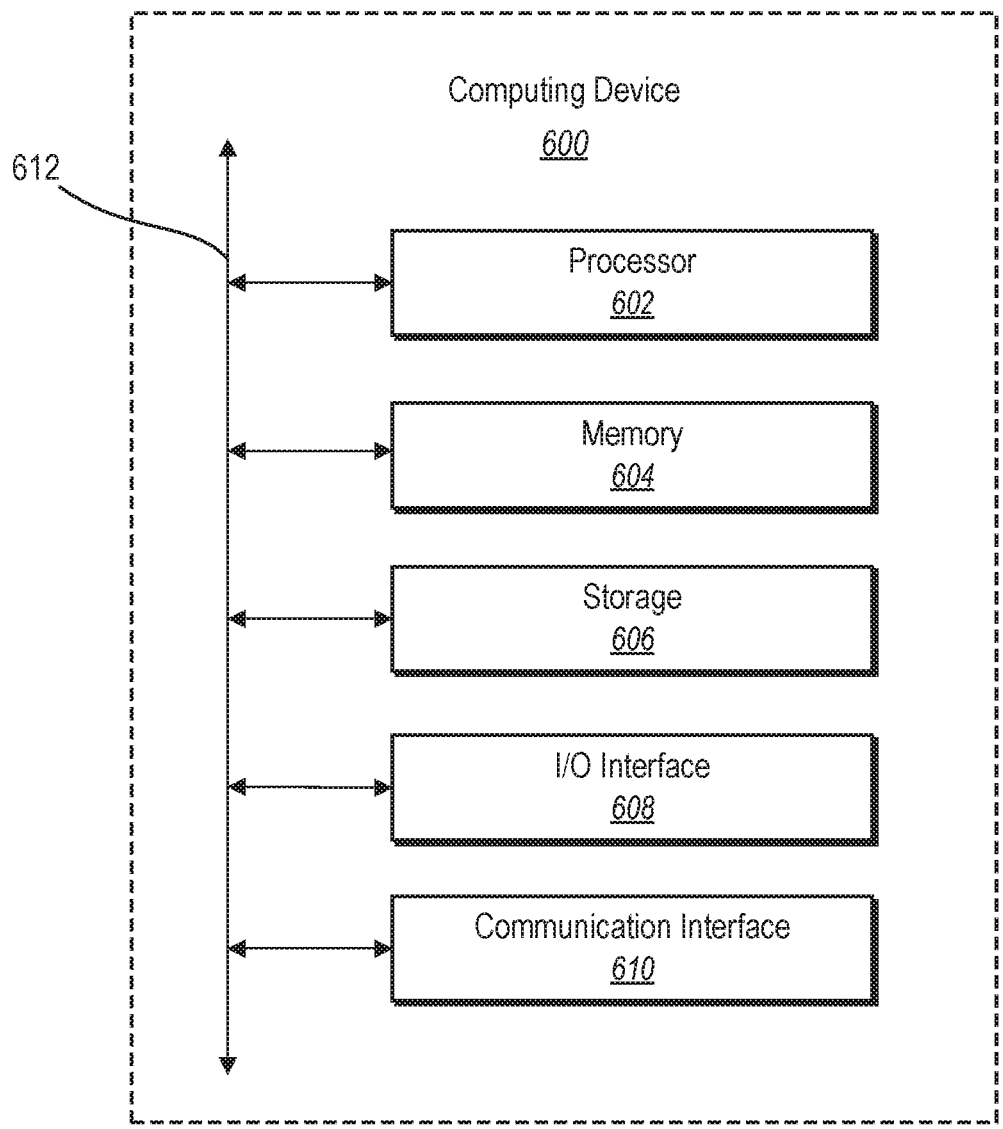
FIG. 6 illustrates a block diagram of an exemplary computing device in accordance with one or more embodiments.

FIG. 6 illustrates a block diagram of an exemplary computing device 600 that may be configured to perform one or more of the processes described above. One will appreciate that the digital UAV positioning system 100 may be implemented by one or more computing devices such as the computing device 600. As shown by FIG. 6, the computing device 600 can comprise a processor 602, memory 604, a storage device 606, an I/O interface 608, and a communication interface 610, which may be communicatively coupled by way of a communication infrastructure 612. While an exemplary computing device 600 is shown in FIG. 6, the components illustrated in FIG. 6 are not intended to be limiting. Additional or alternative components may be used in other embodiments. Furthermore, in certain embodiments, the computing device 600 can include fewer components than those shown in FIG. 6. Components of the computing device 600 shown in FIG. 6 will now be described in additional detail.

In particular embodiments, the processor 602 includes hardware for executing instructions, such as those making up a computer program. As an example, and not by way of limitation, to execute instructions, the processor 602 may retrieve (or fetch) the instructions from an internal register, an internal cache, the memory 604, or the storage device 606 and decode and execute them. In particular embodiments, the processor 602 may include one or more internal caches for data, instructions, or addresses. As an example, and not by way of limitation, the processor 602 may include one or more instruction caches, one or more data caches, and one or more translation lookaside buffers (TLBs). Instructions in the instruction caches may be copies of instructions in the memory 604 or the storage 606.

The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The storage device 606 includes storage for storing data or instructions. As an example and not by way of limitation, the storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. The storage device 606 may include removable or non-removable (or fixed) media, where appropriate. The storage device 606 may be internal or external to the computing device 600. In particular embodiments, the storage device 606 is non-volatile, solid-state memory. In other embodiments, the storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 608 allows a user to provide input to, receive output from, and otherwise transfer data to and receive data from the computing device 600. The I/O interface 608 may include a mouse, a keypad or a keyboard, a touch screen, a camera, an optical scanner, network interface, modem, other known I/O devices or a combination of such I/O interfaces. The I/O interface 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 608 is configured to provide graphical data to a display for presentation to a user. The graphical data may be representative of one or more graphical user interfaces and/or any other graphical content as may serve a particular implementation.

The communication interface 610 can include hardware, software, or both. In any event, the communication interface 610 can provide one or more interfaces for communication (such as, for example, packet-based communication) between the computing device 600 and one or more other computing devices or networks. As an example and not by way of limitation, the communication interface 610 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 610 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 610 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 610 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 612 may include hardware, software, or both that couples components of the computing device 600 to each other. As an example and not by way of limitation, the communication infrastructure 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

I claim:

1. A method comprising:
   detecting, via a base station, one or more signals transmitted from one or more satellites to the base station and a first phase measurement of a first signal from the one or more signals transmitted from the one or more satellites to the base station;
   detecting, by a UAV in flight at a first position, a second phase measurement of a second signal transmitted from the one or more satellites to the UAV;
   identifying the first position of the UAV in flight based on the one or more signals identified by the base station, PPP correction data, the first phase measurement of the first signal transmitted from the one or more satellites to the base station, and the second phase measurement of the second signal transmitted from the one or more satellites to the UAV by:
      determining a position of the base station utilizing the one or more signals identified by the base station and the PPP correction data;
      determining a location of the UAV relative to the base station utilizing the second signal emitted from the one or more satellites to the UAV and RTK correction data generated based on the first phase measurement of the first signal transmitted from the one or more satellites to the base station; and
      utilizing the position of the base station and the location of the UAV relative to the base station to identify the first position of the UAV in flight.

2. The method of claim 1, further comprising:
   receiving digital images of a site captured by the UAV in flight; and generating a three-dimensional model of the site based on the digital images and the identified first position of the UAV.

3. The method of claim 1, further comprising receiving the PPP correction data, wherein the PPP correction data comprises ephemeris data of the one or more satellites.

4. The method of claim 1, wherein the RTK correction data indicates a correction for the second signal emitted from the one or more satellites caused by atmospheric effects.

5. The method of claim 1, further comprising identifying the first position of the UAV based on the one or more signals identified by the base station, the PPP correction data, the first phase measurement of the first signal transmitted from the one or more satellites to the base station, and the second phase measurement of the second signal transmitted from the one or more satellites while the UAV is in flight.

6. The method of claim 1, further comprising identifying the first position of the UAV in flight based on the second phase measurement of the second signal without accessing RTK correction data from an RTK network.

7. The method of claim 1, wherein the base station comprises a dual frequency receiver, and wherein identifying the first position of the UAV is further based on combinations of dual frequency measurements to remove an ionospheric effect on at least one of the one or more signals transmitted from the one or more satellites to the base station.

8. A system comprising:
   at least one processor; and
   at least one computer-readable medium storing instructions that, when executed by the at least one processor, cause the system to:
   detect, via a base station, one or more signals transmitted from one or more satellites to the base station and a first phase measurement of a first signal from the one or more signals transmitted from the one or more satellites to the base station;
   detect, by a UAV in flight at a first position, a second phase measurement of a second signal transmitted from the one or more satellites to the UAV;
   identify the first position of the UAV in flight based on the one or more signals identified by the base station, PPP correction data, the first phase measurement of the first signal transmitted from the one or more satellites to the base station, and the second phase measurement of the second signal transmitted from the one or more satellites to the UAV by:
      determining a position of the base station utilizing the one or more signals identified by the base station and the PPP correction data;
      determining a location of the UAV relative to the base station utilizing the second signal emitted from the one or more satellites to the UAV and RTK correction data generated based on the first phase measurement of the first signal transmitted from the one or more satellites to the base station; and
      utilizing the position of the base station and the location of the UAV relative to the base station to identify the first position of the UAV in flight.

9. The system of claim 8, further comprising instructions that, when executed by the at least one processor, cause the system to:
   receive digital images of a site captured by the UAV in flight; and
   generate a three-dimensional model of the site based on the digital images and the identified first position of the UAV.

10. The system of claim 8, further comprising instructions that, when executed by the at least one processor, cause the system to receive, by the base station, the PPP correction data, wherein the PPP correction data comprises ephemeris data of the one or more satellites.

11. The system of claim 8, wherein the RTK correction data indicates a correction for the second signal emitted from the one or more satellites caused by atmospheric effects.

12. The system of claim 8, further comprising instructions that, when executed by the at least one processor, cause the system to identify the first position of the UAV based on the one or more signals identified by the base station, the PPP correction data, the first phase measurement of the first signal transmitted from the one or more satellites to the base station, and the second phase measurement of the second signal transmitted from the one or more satellites while the UAV is in flight.

13. The system of claim 8, further comprising instructions that, when executed by the at least one processor, cause the system to identify the first position of the UAV in flight based on the second phase measurement of the second signal without accessing RTK correction data from an RTK network.

14. The system of claim 8, wherein the base station comprises a dual frequency receiver, and further comprising instructions that, when executed by the at least one processor, cause the system to identify the first position of the UAV is further based on combinations of dual frequency measurements to remove an ionospheric effect on at least one of the one or more signals transmitted from the one or more satellites to the base station.

15. A non-transitory computer readable medium storing instructions thereon that, when executed by at least one processor, cause a computer system to:
  detect, via a base station, one or more signals transmitted from one or more satellites to the base station and a first phase measurement of a first signal from the one or more signals transmitted from the one or more satellites to the base station;
  detect, by a UAV in flight at a first position, a second phase measurement of a second signal transmitted from the one or more satellites to the UAV;
  identify the first position of the UAV in flight based on the one or more signals identified by the base station, PPP correction data, the first phase measurement of the first signal transmitted from the one or more satellites to the base station, and the second phase measurement of the second signal transmitted from the one or more satellites to the UAV by:
    determining a position of the base station utilizing one or more the signals identified by the base station and the PPP correction data;
    determining a location of the UAV relative to the base station utilizing the second signal emitted from the one or more satellites to the UAV and RTK correction data generated based on the first phase measurement of the first signal transmitted from the one or more satellites to the base station; and
    utilizing the position of the base station and the location of the UAV relative to the base station to identify the first position of the UAV in flight.

16. The non-transitory computer readable medium of claim 15, further comprising instructions that, when executed by the at least one processor, cause the computer system to:
  receive digital images of a site captured by the UAV in flight; and
  generate a three-dimensional model of the site based on the digital images and the identified first position of the UAV.

17. The non-transitory computer readable medium of claim 15, further comprising instructions that, when executed by the at least one processor, cause the computer system to receive, by the base station, the PPP correction data, wherein the PPP correction data comprises ephemeris data of the one or more satellites.

18. The non-transitory computer readable medium of claim 15, wherein the RTK correction data indicates a correction for the second signal emitted from the one or more satellites caused by atmospheric effects.

19. The non-transitory computer readable medium of claim 15, further comprising instructions that, when executed by the at least one processor, cause the computer system to identify the first position of the UAV while the UAV is in flight.

20. The non-transitory computer readable medium of claim 15, further comprising instructions that, when executed by the at least one processor, cause the computer system to identify the first position of the UAV in flight based on the second phase measurement of the second signal without accessing RTK correction data from an RTK network.

* * * * *